United States Patent Office 3,354,048
Patented Nov. 21, 1967

3,354,048
SYNTHESIS OF STEROIDS
Edward J. Becker, Princeton, Robert S. Robison, North Brunswick, and Patrick A. Diassi, Westfield, N.J., assignors, by mesne assignments, to E. R. Squibb & Sons, Inc., New York, N.Y., a corporation of Delaware
No Drawing. Original application Dec. 2, 1964, Ser. No. 415,502. Divided and this application Oct. 28, 1966, Ser. No. 604,499
1 Claim. (Cl. 195—51)

ABSTRACT OF THE DISCLOSURE

Preparing 11α,15α-dihydroxy-A-norprogesterone and 12β,15α-dihydroxy-A-norprogesterone by subjecting A-norprogesterone to the action of the microorganism, *Colletotrichum linicolae*, and recovering the dihydroxy steroids formed.

---

This application is a division of our application, Ser. No. 415,502, filed Dec. 2, 1964, which in turn is a continuation-in-part of copending application, Ser. No. 360,109, filed Apr. 15, 1964.

This invention relates to and has for its object the provision of new physiologically active compounds, and more particularly, compounds of the formulae

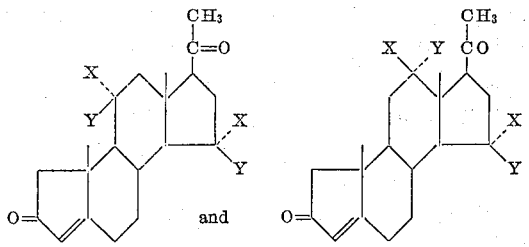

wherein Y is hydrogen; each X is selected from the group consisting of hydroxy and acyloxy; and together X and Y is oxo (O=).

The preferred acyl radicals of this invention are those of hydrocarbon carboxylic acids of less than twelve carbon atoms, as exemplified by the lower alkanoic acids (e.g., acetic, propionic, butyric and tert.-pentanoic acids), the lower alkenoic acids, the monocyclic aryl carboxylic acids (e.g., benzoic and toluic acids), the monocyclic aryl lower alkanoic acids (e.g., phenylacetic and β-phenylpropionic acids), the cycloalkane carboxylic and the cycloalkene carboxylic acids.

The novel compounds of this invention are pharmacologically active substances which possess anti-androgenic activity (i.e., they inhibit the actions of androgens), and which may be used in the treatment of such conditions as hyperandrogenic acne.

The compounds may be formulated for such administration, the concentration and/or dosage being based on the activity of the particular compound and the requirements of the patient.

The final products of this invention are prepared by the process of this invention which entails a number of steps beginning with A-norprogesterone as starting material. It has been found that some of the compounds of this invention, namely, 12,15-dihydroxy-A-norprogesterone and 11,15-dihydroxy-A-norprogesterone can be prepared from A-norprogesterone by subjecting the latter to the action of a microorganism of the genus Colletotrichum or to the action of the enzymes thereof under oxidizing and preferably aerobic conditions; and further that these new compounds may be acylated to other compounds of this invention, namely, 12,15- or 11,15-diacyloxy-A-nor derivatives as by treatment with an acylating agent, for example, an acyl halide or an acyl anhydride in the presence of a base such as pyridine. Alternatively, these new compounds may be oxidized to other compounds of this invention, namely, the 11,15- and 12,15-diketo derivatives of A-norprogesterone as by treatment with an oxidizing agent, such as chromic acid.

To prepare the compounds of this invention, A-norprogesterone is subjected to the action of enzymes of a microorganism of the genus Colletotrichum under oxidizing conditions. This oxidation can best be effected either by including A-norprogesterone in an aerobic culture of the microorganism, or by bringing together in an aqueous medium the compounds, air, and enzymes of nonproliferating cells of the microorganism.

In general, the conditions of culturing the Colletotrichum microorganism for the purposes of this invention are (except for the inclusion of A-norprogesterone to be converted), the same as those of culturing various other microorganisms for the production of antibiotics, Vitamin B-12, and other like substances. The microorganism is grown aerobically in contact with, (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably, however, the medium includes an assimilable source of carbon and energy in addition to the steroid. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoleic acid and myristic acid.

The source of nitrogenous factors utilizable for the purposes of this invention may be organic (e.g., soybean meal, cornsteep liquor, yeast extract, meat extract and/or distillers' solubles) or synthetic (i.e., composes of simple, synthesizable organic or inorganic compounds, such as ammonium salts, alkali nitrates, amino acids or urea).

An adequate sterile air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of the concentration of the compound in the culture is about 0.01% to about 0.1%. The culture period (or rather the time of subjecting the compound to the action of the enzyme) may vary considerably, the range of about twenty-four to ninety-six hours being feasible, but not limiting.

The microbial process described hereinabove yields the 11,15-dihydroxy-A-norprogesterone and the 12,15-dihydroxy-A-norprogesterone derivatives and additionally upon further processing, there is obtained the 11,15- and 12,15-diacyloxy derivatives, respectively, and the 11,15- and 12,15-diketo derivatives of A-norprogesterone. The 11,15- and 12,15-dihydroxy derivatives are first acylated as by treatment with an acylating agent, for example, an acid anhydride (i.e., acetic anhydride) or an acyl halide (e.g., acetyl chloride) in a basic medium (i.e., in pyridine) to yield the respective 11,15- and 12,15-diacyloxy derivatives of the instant invention.

Alternatively, the 11,15- and 12,15-dihydroxy derivatives of A-norprogesterones may be oxidized directly as by treatment with an oxidizing agent, for example, chromic acid to yield respectively the 11,15- and 12,15-diketo derivatives of A-norprogesterone which are also new compounds of this invention.

The invention may be illustrated by the following examples:

*Example 1.—11α,15α-dihydroxy-A-norprogesterone and 12β,15α-dihydroxy-A-norprogesterone*

A 150 gallon fermentor containing 112 g. of A-norprogesterone in media containing corn steep liquor, $NH_4H_2PO_4$, $CaCO_3$, yeast extract, dextrose and soy bean oil is inoculated with a culture of *Collectotrichum linicolae* NCTC (National Collection of Type Cultures) No. 1194 (obtainable from the Commonwealth Mycological Institute, Kew, Surrey, England). After thirty-six hours, the whole broth is filtered and the filtrate extracted with one-half volume of chloroform in a Podbielniak extractor. The chloroform solution is washed with water, dried over sodium sulfate and evaporated to a crystalline mass. Trituration with 3×1000 ml. of hexane removes color and oil. The crude dry weight is 101.6 g. This material is recrystallized from acetone/hexane to give 67 g. of product which contains 11α,15α-dihydroxy-A-norprogesterone and 12β,15α-dihydroxy-A-norprogesterone.

The separation of these components is accomplished by column chromatography on 2300 g. alumina. Elution of the column with chloroform and continued elution with chloroform/methanol 200:1 and 100:1 gives 10.3 g. of 12β,15α-dihydroxy-A-norprogesterone having the following properties: M.P. 244–246° C.; $[\alpha]_D^{25}+40°$ (20.30 mg./2 ml. $CHCl_3$);

$\lambda_{max}^{EtOH}$ 234 m$\mu$ ($\epsilon$, 16,400); $\lambda_{max}^{nujol}$ 2.89, 5.89, 6.00, 6.21 7.92, 8.51, 9.39, and 11.73$\mu$

*Analysis.*—Calc'd for $C_{20}H_{28}O_4$ (332.42): C, 72.26%; H, 8.49%. Found: C, 72.29; H, 8.58%, and finally elution with chloroform/methanol 50:1, 25:1 and 10:1 gives 2.4 g. of 11α,15α - dihydroxy-A-norprogesterone having the following properties: M.P. 260–263° C.; $[\alpha]_D^{26}+107°$ (21.40 mg./2 ml. $CHCl_3$);

$\lambda_{max}^{EtOH}$ 233 m$\mu$ ($\epsilon$, 16,600); $\lambda_{max}^{nujol}$ 2.84, 2.91, 5.91, 6.00, 6.22, 7.50, 7.90, 8.09, 8.50, 9.43, 11.35, and 11.61$\mu$

*Analysis.*—Calc'd for $C_{20}H_{28}O_4$ (332.42): C, 72.26%; H, 8.49%. Found: C, 72.19%; H, 8.52%.

*Example 2.—12β,15α-diacetoxy-A-norprogesterone*

106 mg. of 12β,15α-dihydroxy-A-norprogesterone is dissolved in 5 ml. of anhydrous pyridine and 2.5 ml. of acetic anhydride. After standing at room temperature for eighteen hours, the solution is diluted with ice then extracted with chloroform. The organic phase is washed with acid, water, dried over sodium sulfate and evaporated to a crystalline mass (138 mg.) Recrystallization from acetone/hexane gives 100 mg. of the 12β,15α-diacetoxy-A-norprogesterone, having the following properties: M.P. 203–207° C.; $[\alpha]_D^{26}+62°$ (20.8 mg./2 ml. $CHCl_3$);

$\lambda_{max}^{EtOH}$ 232 m$\mu$ ($\epsilon$, 17,000); $\lambda_{max}^{nujol}$ 5.79, 5.90, 5.96, 6.20, 8.04, 9.49, 9.56, and 9.76$\mu$

*Example 3.—11α,15α-diacetoxy-A-norprogesterone*

105 mg. of 11α,15α-dihydroxy-A-norprogesterone is dissolved in pyridine and acetic anhydride and after eighteen hours at room temperature, it is worked up as described. Recrystallization from acetone/hexane gives 100 mg. of the 11α,15α - diacetoxy-A-norprogesterone, having the following properties: M.P. 44–247° C.; $[\alpha]_D^{25}+100°$ (20.39 mg./2 ml. $CHCl_3$);

$\lambda_{max}^{EtOH}$ 231 m$\mu$ ($\epsilon$, 16,700); $\lambda_{max}^{nujol}$ 5.77, 5.87, sh 5.91, 6.14, 8.01, 8.12, 9.50, and sh 9.61$\mu$

*Example 4.—12,15-dioxo-A-norprogesterone*

105 mg. of 12β,15α-dihydroxy-A-norprogesterone is dissolved in 20 ml. of acetone. 0.5 ml. of 8 N chromic acid reagent is added and the solution held at room temperature for one hour. The excess reagent is destroyed with isopropanol, water added and the solution extracted with chloroform. The chloroform phase is washed with sodium carbonate, water, then dried over sodium sulfate and evaporated giving a crude product of 89 mg. Recrystallization from acetone/hexane gives 63 mg. of the tetraketone, having the following properties: M.P. 200–203° C.; $[\alpha]_D^{27}+175°$ (21.02 mg./2 ml. $CHCl_3$);

$\lambda_{max}^{EtOH}$ 232 m$\mu$ ($\epsilon$, 15,800) $\lambda_{max}^{nujol}$ 5.78, 5.85, 5.92, 6.14, 8.40, 9.00, 9.80, and 11.75$\mu$

*Example 5.—11,15-dioxo-A-norprogesterone*

103 mg. of 11α,15α - dihydroxy-A-norprogesterone is dissolved in 40 ml. of acetone. The solution is treated with 0.5 ml. of 8 N chromic acid reagent and after one hour at room temperature, the product is worked up as described above. The crude material (95 mg.) is recrystallized from acetone/hexane to give 62 mg. of the tetraketone, having the following properties: M.P. 223–227° C.; $[\alpha]_D^{25}+173°$ (20.24 mg./2 ml. $CHCl_3$);

$\lambda_{max}^{EtOH}$ 231 m$\mu$ ($\epsilon$, 15,300); $\lambda_{max}^{nujol}$ 5.75, 5.88, 5.99, 6.19, 8.20 8.30, 9.11, and 10.96$\mu$ The invention may be variously otherwise embodied within the scope of the appended claim.

What is claimed is:

The process for preparing 11α,15α - dihydroxy-A-norprogesterone and 12β,15α - dihydroxy-A-norprogesterone which comprises subjecting A-norprogesterone to the action of the microorganism *Colletotrichum linicolae* under oxidizing conditions and recovering the dihydroxy-A-norprogesterones formed.

References Cited

UNITED STATES PATENTS

| | | | |
|---|---|---|---|
| 2,793,162 | 5/1957 | Thoma et al. | 195—51 |
| 2,879,280 | 3/1959 | Fried et al. | 195—51 X |
| 3,005,028 | 10/1961 | Thoma et al. | 195—51 |

ALVIN E. TANENHOLTZ, *Primary Examiner.*